US012784315B2

(12) United States Patent
Fang et al.

(10) Patent No.: US 12,784,315 B2
(45) Date of Patent: Nov. 3, 2026

(54) CONTROLLABLE IMAGE-TO-VIDEO GENERATION

(71) Applicant: Amazon Technologies, Inc., Seattle, WA (US)

(72) Inventors: Zhiyuan Fang, San Jose, CA (US); Shoubin Yu, Carrboro, NC (US); Gunnar Atli Sigurdsson, Oakland, CA (US); Jian Zheng, San Jose, CA (US); Vincente Ignacio Ordonez Roman, Houston, TX (US); Robinson Piramuthu, Oakland, CA (US); Mohit Bansal, Carrboro, NC (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 183 days.

(21) Appl. No.: 18/604,917

(22) Filed: Mar. 14, 2024

(65) Prior Publication Data

US 2025/0292472 A1 Sep. 18, 2025

(51) Int. Cl.

*G06T 13/00* (2011.01)
*G06F 40/40* (2020.01)
*G06T 5/60* (2024.01)
*G06T 5/70* (2024.01)
(Continued)

(52) U.S. Cl.

CPC .............. *G06T 13/00* (2013.01); *G06F 40/40* (2020.01); *G06T 5/60* (2024.01); *G06T 5/70* (2024.01); *G06T 5/77* (2024.01); *G06T 7/73* (2017.01); *G06T 2200/24* (2013.01);
(Continued)

(58) Field of Classification Search

CPC .. G06T 13/00; G06T 7/73; G06T 5/60; G06T 5/77; G06T 5/70; G06T 2200/24; G06T 2207/10016; G06T 2207/20084; G06T 2207/20092; G06T 2210/12; G06T 11/00;
(Continued)

(56) References Cited

U.S. PATENT DOCUMENTS

2025/0175679 A1* 5/2025 Zhang .................. H04N 21/816
2025/0200827 A1* 6/2025 Joshi ....................... G06N 3/088

OTHER PUBLICATIONS

Dombrowski et al., "Foreground-Background Separation through Concept Distillation from Generative Image Foundation Models," 2023 IEEE/CVF International Conference on Computer Vision (ICCV), Paris, France, pp. 988-998, 2023. (Year: 2023).*
(Continued)

*Primary Examiner* — Kent W Chang
*Assistant Examiner* — Matthew Clothier
(74) *Attorney, Agent, or Firm* — K&L Gates LLP

(57) ABSTRACT

Techniques are generally described for controllable image-to-video generation. In various examples, a first image representing at least a first object may be received. First input data including a selection of the first object in the first image for animation may be received. Second input data including at least a first bounding box indicating a target location of the first object may be received. A latent diffusion text-to-image model and the first image may be used to generate a first plurality of visual tokens. One or more first grounding tokens may be generated representing a location of the first bounding box. The latent diffusion text-to-image model may be used to generate a video animating the first object based on the first plurality of visual tokens and the one or more first grounding tokens.

17 Claims, 7 Drawing Sheets

(51) Int. Cl.
*G06T 5/77* (2024.01)
*G06T 7/73* (2017.01)

(52) U.S. Cl.
CPC ............... *G06T 2207/10016* (2013.01); *G06T 2207/20084* (2013.01); *G06T 2207/20092* (2013.01); *G06T 2210/12* (2013.01)

(58) Field of Classification Search
CPC ......... G06T 13/80; G06F 40/40; G06N 3/045; G06N 3/088; G11B 27/031
See application file for complete search history.

(56) References Cited

OTHER PUBLICATIONS

Wang et al., "Boximator: generating rich and controllable motions for video synthesis," arXiv preprint arXiv:2402.01566, Feb. 2, 2024. (Year: 2024).*

Li et al.; GLIGEN: Open-Set Grounded Text-to-Image Generation; Cornell University Library; Apr. 17, 2023; 21 pgs; Ithaca, NY.

Jain et al.; Peekaboo: Interactive Video Generation via Masked-Diffusion; IEEE/CVF Conference on Computer Vision and Pattern Recognition; Dec. 12, 2023; 13 pgs.

Ma et al.; Follow-Your-Click: Open-domain Regional Image Animation via Short Prompts; Cornell University Library; Mar. 13, 2024; 20 pgs; Ithaca, NY.

Yu et al.; Zero-Shot Controllable Image-to-Video Animation via Motion Decomposition; Workshop on Quantum Computing and Quantum-Inspired Technology; Mar. 13, 2024.

Mourik, Piet; International Search Report and Written Opinion of PCT/US2025/019535; Jun. 20, 2025; 11 pgs.

Guo et al.; AnimateDiff: Animate Your Personalized Text-to-Image Diffusion Models without Specific Tuning; Cornell University, Computer Science > Computer Vision and Pattern Recognition; Jul. 10, 2023; 13 pgs.

* cited by examiner

CONTROLLABLE IMAGE-TO-VIDEO GENERATION

BACKGROUND

Artificial intelligence-based text-to-image and image-to-image models may be used to generate new images from input text and/or input images. In the text-to-image context, the input is a natural language description and the text-to-image model generates an image matching the input description. Image-to-image models may take a source image as input and may generate a new image that may include characteristics of a target domain while retaining certain characteristics of the source image. In some instances, text descriptions may be used to condition an image-to-image model to describe the desired manipulations and/or transformations to be performed on the source image when generating the new image.

DETAILED DESCRIPTION

Figure 1:
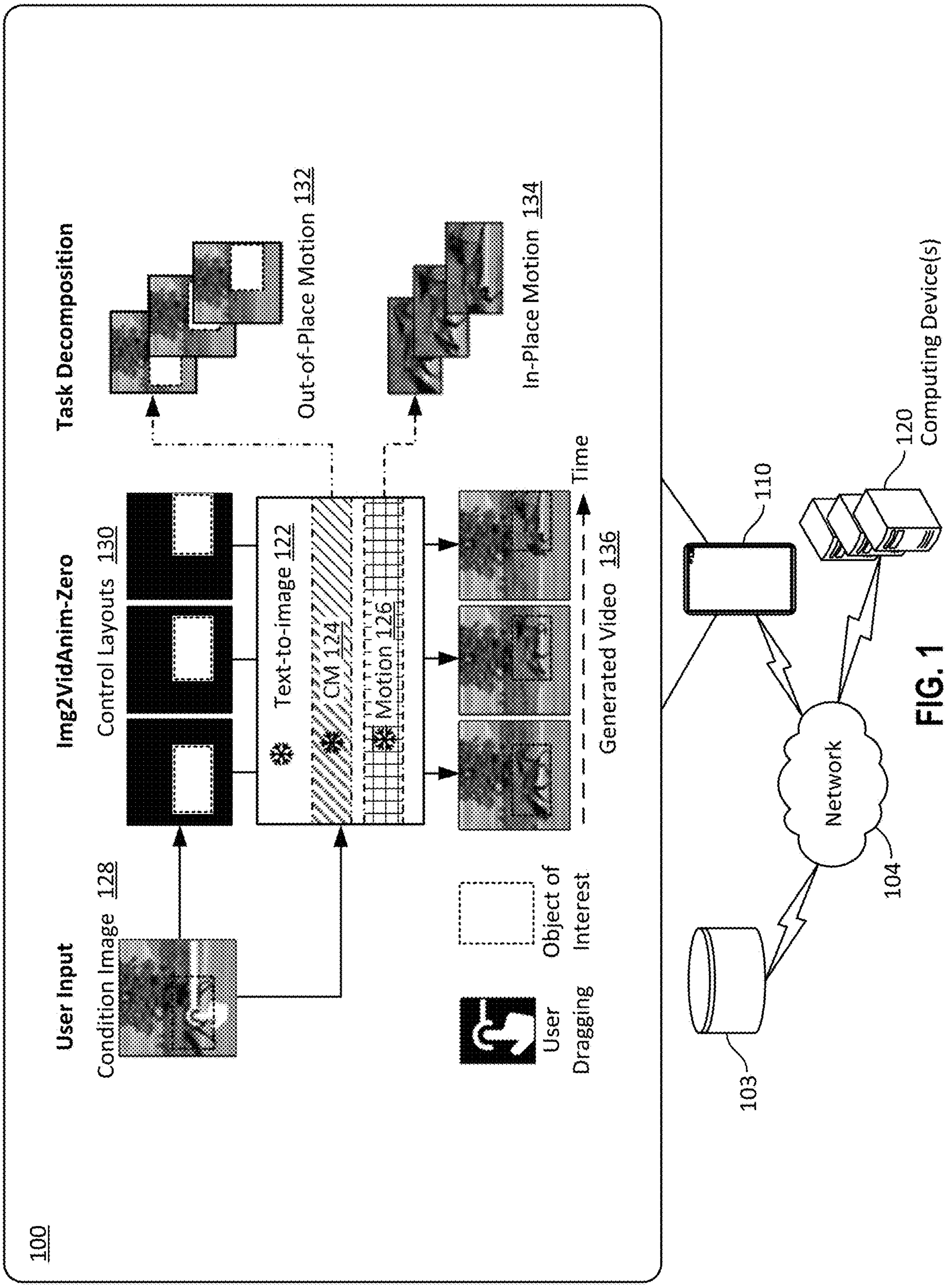
FIG. 1 depicts an example controllable image-to-video model that may allow a user to selectively and controllably animate one or more objects in an image, in accordance with various aspects of the present disclosure.

In the following description, reference is made to the accompanying drawings that illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

The rising demand for controllable video generation underscores the desire of users to create videos for an increasing list of applications, such as personalized content (e.g., for social media), educational content generation, dynamic visualizations through user-generated (and/or other) content, entertainment content such as a short movie, where precise control of motion may be desired, etc. Some recent approaches input text prompts into generative artificial intelligence models (e.g., diffusion-based text-to-image and/or text-to-video models), but such approaches do not allow users to interactively control fine-grained details of the animation (such as the trajectory or path of one or more objects in the video).

Some example approaches for controllable video generation may focus on the Image-to-Video generation task (I2V). I2V starts from a given condition image, eliminating the ambiguity often encountered with Text-to-Video (T2V) generation, enabling more diverse video animation based on additional conditions (e.g. text, trajectory, or reference video). As a result, I2V blends precision, versatility, and a more user-friendly setup, positioning itself as a promising direction for controllable video generation. Recent I2V methods have utilized models trained on massive sets of video data with pre-extracted motion features. However, ensuing challenges arise with respect to computational resources and data collection. For example, even with efficient training schemes like parameter-efficient fine-tuning, training models to understand new control conditions (e.g., motion vectors, trajectories) remains a highly compute-intensive task. As far as data collection, acquiring large amounts of video data with meticulously annotated conditions for training can be time consuming and expensive.

Described herein, is a new machine learning architecture for the I2V task referred to as IMG2VIDANIM-ZERO ($IVA^0$). $IVA^0$ provides zero-shot controllable Image-to-Video Animation without any I2V training data. Accordingly, $IVA^0$ enables fine-grained user control of animations (e.g., via user-provided motion paths (sometimes referred to as layouts or trajectories)) without requiring any annotated training videos. Zero-shot, in this context, refers to the $IVA^0$ model's ability to complete the I2V task without any training data (e.g., video data).

The inputs for $IVA^0$ comprises the condition image (e.g., the image to be animated) and motion trajectories for objects of interest, represented by sequences of bounding box layouts (or by a user-drawn trajectory on a graphical user interface). $IVA^0$ simplifies the controllable I2V task by decomposing it into two atomic tasks: (1) Out-of-place Motion Generation focuses on determining the coarse layout of objects' displacement throughout the video frames, and (2) In-place Motion Animation ensures consistency of the object from frame-to-frame while facilitating plausible, smooth motion (pixel-level changes) for objects across the frames.

FIG. 1 depicts an example of the controllable image-to-video model $IVA^0$ 100 that may allow a user to selectively and controllably animate one or more objects in an image, in accordance with various aspects of the present disclosure. As shown in FIG. 1, $IVA^0$ 100 may comprise: (1) a pre-trained text-to-image model 122, (2) the Control Module (CM) 124, and (3) Motion Module (MM) 126. Out-of-place motion generation is formulated as a layout-to-image generation task, achieved by inserting one or more gated self-attention layers as a layout control module, leveraging bounding box layouts for precise object placements. This is referred to as control module 124. In-place motion animation is achieved by adopting temporal attention layers from the text-to-video generation task. This is referred to as the motion module 126. Motion module 126 maintains the consistency of the selected objects by applying self-attention across frames, leading to a realistic and smooth transition of objects from one frame to the next. Notably, CM 124 and MM 126 are pre-trained on corresponding task-aligned datasets without any I2V-specific training. Additionally, described herein is a Motion Afterimage Suppression (MAS) scheme that generates frames via alternating different inpainting operations to reduce afterimage hallucination objects that could be left trailing behind the motion trajectory, while maintaining the background.

The text-to-image model 122 may be a pre-trained latent diffusion inpainting model (e.g., trained on a dataset comprising text and image pairs). Inpainting is a digital image processing technique that may be used to replace one portion of an existing image with other image data. For example, inpainting may be used to restore or reconstruct missing or damaged parts of photographs. In this context, inpainting may include replacing the relevant part of the image with new plausible image data (e.g., pixel values) based on the surrounding pixels or other information. In other examples, inpainting may involve replacing a masked portion of the image with image data representing a subject object (e.g., a user selected object). Ideally, inpainting is performed such that the inpainted object appears naturally within the image (e.g., based on prevailing illumination conditions, etc.).

Machine learning techniques, such as those described herein, are often used to form predictions, solve problems, recognize objects in image data for classification, etc. For example, machine learning techniques may be used to detect objects represented in image data and/or translate text from one spoken language to another. In various examples, machine learning models may perform better than rule-based systems and may be more adaptable as machine learning models may be improved over time by retraining the models as more and more data becomes available. Accordingly, machine learning techniques are often adaptive to changing conditions. Deep learning algorithms, such as neural networks, are often used to detect patterns in data and/or perform tasks.

Generally, in machine learned models, such as neural networks, parameters control activations in neurons (or nodes) within layers of the machine learned models. The weighted sum of activations of each neuron in a preceding layer may be input to an activation function (e.g., a sigmoid function, a rectified linear units (ReLU) function, etc.). The result determines the activation of a neuron in a subsequent layer. In addition, a bias value can be used to shift the output of the activation function to the left or right on the x-axis and thus may bias a neuron toward activation.

Generally, in machine learning models, such as neural networks, after initialization, annotated training data may be used to generate a cost or "loss" function that describes the difference between expected output of the machine learning model and actual output. The parameters (e.g., weights and/or biases) of the machine learning model may be updated to minimize (or maximize) the cost. For example, the machine learning model may use a gradient descent (or ascent) algorithm to incrementally adjust the weights to cause the most rapid decrease (or increase) to the output of the loss function. The method of updating the parameters of the machine learning model is often referred to as back propagation.

Transformer models (e.g., transformer machine learning models) are machine learning models that include an encoder network and a decoder network. The encoder takes an input and generates feature representations (e.g., feature vectors, feature maps, etc.) of the input. The feature representation is then fed into a decoder that may generate an output based on the encodings. In natural language processing, transformer models take sequences of words as input. For example, a transformer may receive a sentence and/or a paragraph comprising a sequence of words as an input. In various examples described herein, a transformer may instead receive a set of images of objects as input. For example, vision transformers may be used that generate patches of input images. Likening the vision transformer to the natural language task, such image patches may then serve as "visual words." Additionally, with vision transformers, a backbone network need not be used and the raw pixel values of the input images may be directly input into the model.

In general, the encoder network of a transformer comprises a set of encoding layers that processes the input data one layer after another. Each encoder layer generates encodings (referred to herein as "tokens"). In the context of a vision transformer, the tokens may be described as visual tokens. These tokens include feature representations (e.g., feature vectors and/or maps) that include information about which parts of the input data are relevant to each other. For example, for each input embedding the encoder layers may determine which parts of the token are relevant to other tokens received as part of the input data. Each encoder layer passes its token output to the next encoder layer. The decoder network of the transformer takes the tokens output by the encoder network and processes them using the encoded contextual information and the encoder-decoder attention mechanism to generate output embeddings. Each encoder and decoder layer of a transformer uses an attention mechanism, which for each input, weighs the relevance of every other input and draws information from the other inputs to generate the output. Each decoder layer also has an additional attention mechanism which draws information from the outputs of previous decoders, prior to the decoder layer determining information from the encodings. Both the encoder and decoder layers have a feed-forward neural network for additional processing of the outputs, and contain residual connections and layer normalization steps.

Scaled Dot-Product Attention

The basic building blocks of the transformer are scaled dot-product attention units. When input data is passed into a transformer model, attention weights are calculated between every token simultaneously. The attention unit produces embeddings for every token in context that contain information not only about the token itself, but also a weighted combination of other relevant tokens weighted by the attention weights.

Concretely, for each attention unit the transformer model learns three weight matrices; the query weights $W_Q$, the key weights $W_K$, and the value weights $W_V$. For each token i, the input embedding $x_i$ is multiplied with each of the three weight matrices to produce a query vector $q_i=x_i W_Q$, a key vector $k_i=x_i W_K$, and a value vector $v_i=x_i W_V$. Attention weights are calculated using the query and key vectors: the attention weight $a_{ij}$ from token i to token j is the dot product between $q_i$ and $k_j$. The attention weights are divided by the square root of the dimension of the key vectors, $\sqrt{d_k}$, which stabilizes gradients during training. The attention weights are then passed through a softmax layer that normalizes the weights to sum to 1. The fact that $W_Q$ and $W_K$ are different matrices allows attention to be non-symmetric: if token i attends to token j, this does not necessarily mean that token j will attend to token i. The output of the attention unit for token i is the weighted sum of the value vectors of all tokens, weighted by $a_{ij}$, the attention from i to each token.

The attention calculation for all tokens can be expressed as one large matrix calculation, which is useful for training due to computational matrix operation optimizations which make matrix operations fast to compute. The matrices Q, K, and V are defined as the matrices where the ith rows are vectors $q_i$, $k_i$, and $v_i$ respectively.

$$\text{Attention}(Q, K, V) = \text{softmax}\left(\frac{QK^T}{\sqrt{d_k}}\right)V$$

Multi-Head Attention

One set of ($W_Q$, $W_K$, $W_V$) matrices is referred to herein as an attention head, and each layer in a transformer model has multiple attention heads. While one attention head attends to the tokens that are relevant to each token, with multiple attention heads the model can learn to do this for different definitions of "relevance." The relevance encoded by transformers can be interpretable by humans. For example, in the natural language context, there are attention heads that, for every token, attend mostly to the next word, or attention heads that mainly attend from verbs to their direct objects. Since transformer models have multiple attention heads, they have the possibility of capturing many levels and types of relevance relations, from surface-level to semantic. The multiple outputs for the multi-head attention layer are concatenated to pass into the feed-forward neural network layers.

Each encoder comprises two major components: a self-attention mechanism and a feed-forward neural network. The self-attention mechanism takes in a set of input encodings from the previous encoder and weighs their relevance to each other to generate a set of output encodings. The feed-forward neural network then further processes each output encoding individually. These output encodings are finally passed to the next encoder as its input, as well as the decoders.

The first encoder takes position information and embeddings of the input data as its input, rather than encodings. The position information is used by the transformer to make use of the order of the input data or in various examples described herein, the positions of the items in the input scene image. In various examples described herein, the position embedding may describe a spatial relationship of a plurality of tokens relative to other tokens. For example, an input token may represent a 16×16 (or other dimension grid) overlaid on an input frame of image data. The position embedding may describe a location of an item/token within the grid (e.g., relative to other tokens representing other portions of the frame). Accordingly, rather than a one-dimensional position embedding (as in the natural language context wherein the position of a word in a one-dimensional sentence/paragraph/document is defined), the various techniques described herein describe two-dimensional that describe the spatial location of a token within the input data (e.g., a two-dimensional position within a frame, a three-dimensional position within a point cloud, etc.).

Each decoder layer comprises three components: a self-attention mechanism (e.g., scaled dot product attention), an attention mechanism over the encodings (e.g., "encoder-decoder" attention), and a feed-forward neural network. The decoder functions in a similar fashion to the encoder, but an additional attention mechanism is inserted which instead draws relevant information from the encodings generated by the encoders. In a self-attention layer, the keys, values and queries come from the same place—in the case of the encoder, the output of the previous layer in the encoder. Each position in the encoder can attend to all positions in the previous layer of the encoder. In "encoder-decoder attention" layers (sometimes referred to as "cross-attention"), the queries come from the previous decoder layer, and the keys and values come from the output of the encoder. This allows every position in the decoder to attend over all positions in the input sequence. The decoder is attending to the encoder features.

In various examples, one or more computing devices (e.g., including computing device(s) 120, mobile device 110, etc.) may be used to implement IVA$^0$ 100. In various examples, the one or more computing devices implementing IVA$^0$ 100 may be configured in communication over a network 104. Network 104 may be a communication network such as a local area network (LAN), a wide area network (such as the Internet), or some combination thereof. The one or more computing devices implementing IVA$^0$ 100 may communicate with non-transitory computer-readable memory 103 (e.g., either locally or over network 104). Non-transitory computer-readable memory 103 may store instructions that may be effective to perform one or more of the various techniques described herein. For example, the instructions may be effective to implement one or more of the various machine learning models described herein.

As a generative AI task, different approaches have been used for video generation. Some approaches focus on unconditional generation that is based on the vector initialized from a predefined probability space (e.g., a Gaussian distribution). Some other approaches introduce various generation conditions and can be roughly categorized into: i) Text-to-Video generation (T2V): where descriptive text is used as input to guide the generation process, ii) Video-to-Video generation (V2V): wherein a reference video informs the structure of the generated video, and iii) Image-to-Video generation (I2V): which uses a single or a series of images as the basis to produce a continuous frame sequence. The various techniques described herein focus on the I2V formulation, which provides a clear visual starting point compared with T2V and gives more flexibility compared with V2V. However, the approaches described herein enable layout-based controllability into the I2V in a zero-shot regime.

Some approaches for controllable video generation center around encoding images and motion trajectories, mainly for human movement. However, in contrast to many other approaches, the systems and techniques described herein for IVA$^0$ 100 is not text-based or fine-tuned (or otherwise trained) for the task, but is instead an image-based zero-shot generation without any I2V-specific training. In addition, the systems and techniques described herein can be combined with other language model-based layout planning models to generate layout trajectory/sequence based on text (e.g., text prompt tokens) for a more diverse control condition input.

As shown in FIG. 1, the inputs to IVA$^0$ 100 include the condition image 128 (e.g., a user input image with one or more objects to be animated) and control layouts 130. Additionally, the user may select the one or more objects of interest (e.g., using a user-drawn and/or pre-existing bounding box, segmentation mask, etc.) and may provide control layouts 130 for each object to-be animated. The control layouts 130 may define the path of motion of the object within the scene provided by the condition image 128. The user may provide the control layouts 130 by providing per-frame bounding boxes (e.g., for two or more different frames of the generated video). In some other examples, the user may use a touch input to draw a trajectory of the object within the scene of the condition image 128 to show how the object should move within the frame in the resultant video. As previously described, the out-of-place motion 132 provided by control module 124 generally controls how the object of interest moves from position to position in the user-provided control layout 130. The in-place motion 134 ensures consistency of the object (e.g., a running horse in the example of FIG. 1) while illustrating smooth, plausible pixel-level changes (e.g., to show the horses legs and head moving as it gallops across the scene) from frame-to-frame of the resultant video (e.g., generated video 136).

Figure 2:
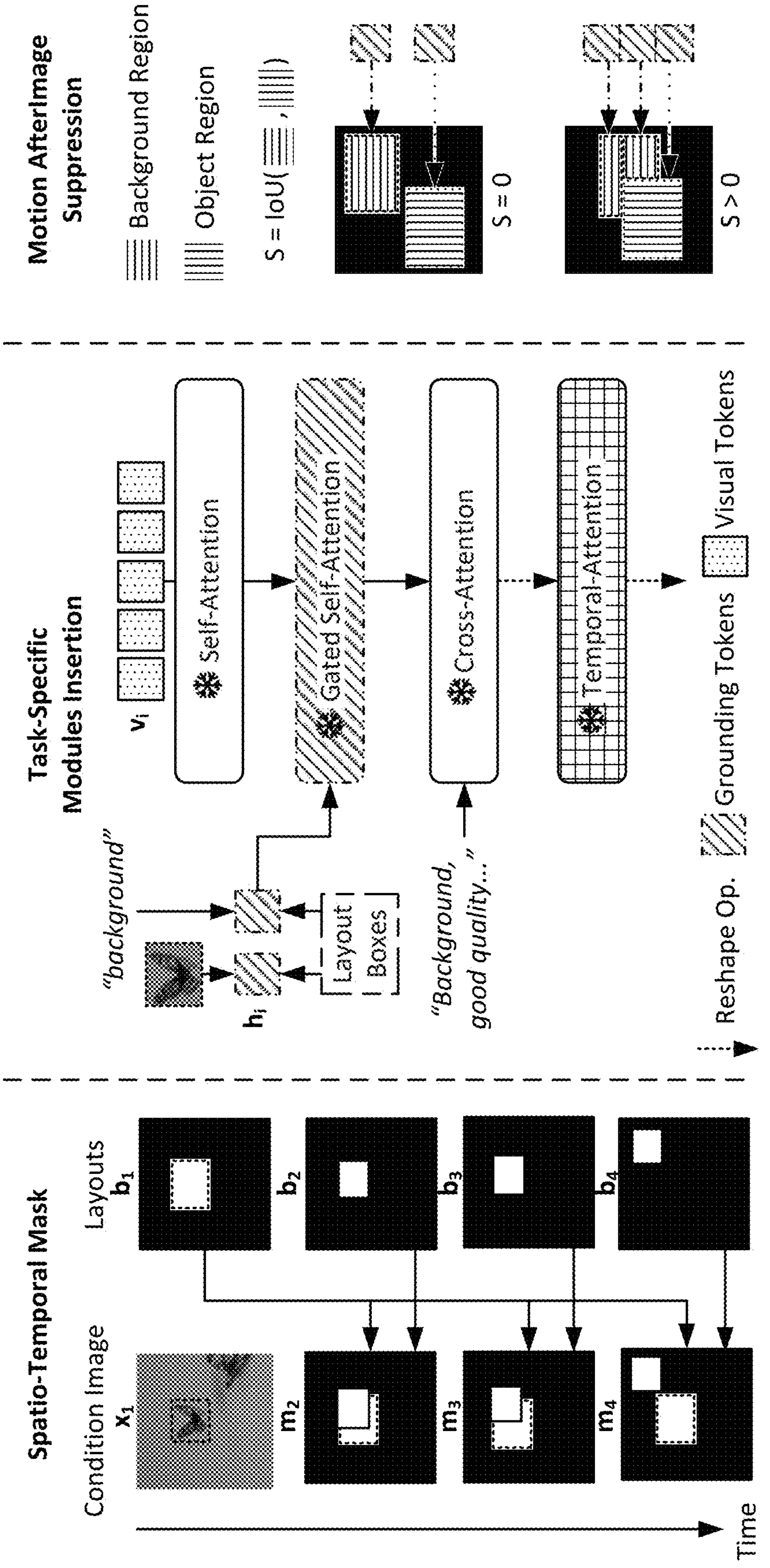
FIG. 2 depicts additional detail regarding various components of the controllable image-to-video model of FIG. 1, in accordance with various aspects of the present disclosure.

FIG. 2 depicts additional detail regarding various components of the controllable image-to-video model (IVA$^0$ 100) of FIG. 1, in accordance with various aspects of the present disclosure. As an initial matter, an example formulation of inpainting based on latent diffusion is described, which may be used as a foundation of the pre-trained text-to-image model 122 prior to the various modifications described herein. Next, an example instantiation of IVA$^0$ 100 is described, which may include decomposing a controllable I2V task into sub-tasks which may be addressed using out-of-place and in-place motion modules for latent diffusion. Finally, various Motion Afterimage Suppression (MAS) techniques are described to eliminate object afterimage hallucination.

Latent Diffusion for Inpainting

The objective of IVA$^0$ 100 is to animate one or more static objects, facilitating their transition from an initial position to a subsequent position based on any user-defined layout (e.g., motion path or trajectory). In some examples described herein, this task may be framed as an in-painting task for controlling such object movement, which involves: (1) replacing the original object location with the background, while (2) inpainting the object at the new location(s) based on the user-provided layout. To accomplish this, IVA$^0$ 100 is constructed on the inpainting version of Latent Diffusion, a pre-trained text-to-image model. The Latent Diffusion model comprises three key components: (1) an autoencoder that maps the image from pixel space to a latent embedding (based on which the Diffusion module operates) and which also projects the embedding, after denoising steps, back into the pixel space; (2) a text encoder that encodes a prompt into embedding for Text-to-Image conditioning; and (3) a U-Net for noise diffusion, which iteratively conducts denoising in the latent space, guided by timestamps and prompt embedding.

The inpainting task leverages the Latent Diffusion model to modify a masked image region based on the given textual conditions. This mask (e.g., mask data) is represented as a 1-channel binary mask as an additional input together with the condition image. The condition image provides essential context for the un-inpainted sections (e.g., background) and is derived by processing a condition image $x_{con}$ through the encoder. To adapt to these extra inpainting conditions, the diffusion U-Net may incorporate five extra channels in its initial convolution layer. Given a condition image $x_{con}$, a text prompt p, and a binary mask m, the inpainting model generates an image. In the following sections, and as depicted in FIG. 2, the integration of control conditions are shown and described for IVA$^0$ 100. Additionally, techniques for handling the atomic tasks with this text-to-image inpainting model are described in order to achieve controllable I2V (as instantiated by IVA$^0$ 100).

Zero-Shot Layout-Conditioned I2V

In IVA$^0$ 100, a controllable Image-to-Video generation model is introduced that leverages user-provided spatio-temporal object layouts as shown in the left hand column 202 of FIG. 2. Given an initial frame $x_1$ as condition image $x_{con}$, users can animate specific objects by providing a trajectory (e.g., a motion path for subsequent frames of the output video) of the object. This trajectory may be represented as a sequence of bounding boxes: $(b_1 \ldots b_t)$, where t refers to the number of frames. Each box $b_i$ may be a 4-dimensional vector indicating the top-left and bottom-right coordinates of the box (e.g., in a coordinate space of frames of image data, such as x, y axis pixel coordinates). However, the bounding boxes may be represented in other fashions. In addition, segmentation masks may be used to identify an object and its trajectory at a per-pixel level. For simplicity, animation of a single object is described. However, it should be noted that IVA$^0$ 100 is versatile and can be extended to any number of objects (e.g., multiple objects simultaneously) when provided with corresponding layouts. The detailed model pipeline is elaborated as follows:

Layout Condition via Spatio-Temporal Masking

A future frame $x_i$ is generated based on the initial frame $x_1$ ($x_{con}$) and layout boxes via the text-to-image Latent Diffusion model. When transitioning the object from its position $b_1$ to $b_i$, the object is expected to move to the desired location with smoothly inter-polated motion and consistent appearance for both the foreground object and background context. This leads to inpainting $x_i$ in two regions: (1) eliminate the object from the original region at $b_1$ (i.e., to replace the object with background in $x_i$, and (2) add the object to the new region $b_i$ in frame $x_i$. Accordingly, as shown in left hand column 202, an inpainting mask is generated for each frame by simultaneously masking out both starting region $b_1$ and target region $b_i$. As illustrated in left hand column 202, from the spatio-temporal layout sequence $(b_1 \ldots b_t)$, we construct the spatio-temporal masking sequence $M=m_1 \ldots m_t$, with each $mi=b_1 \cup b_i$.

Out-of-Place Motion Generation

Figure 3:
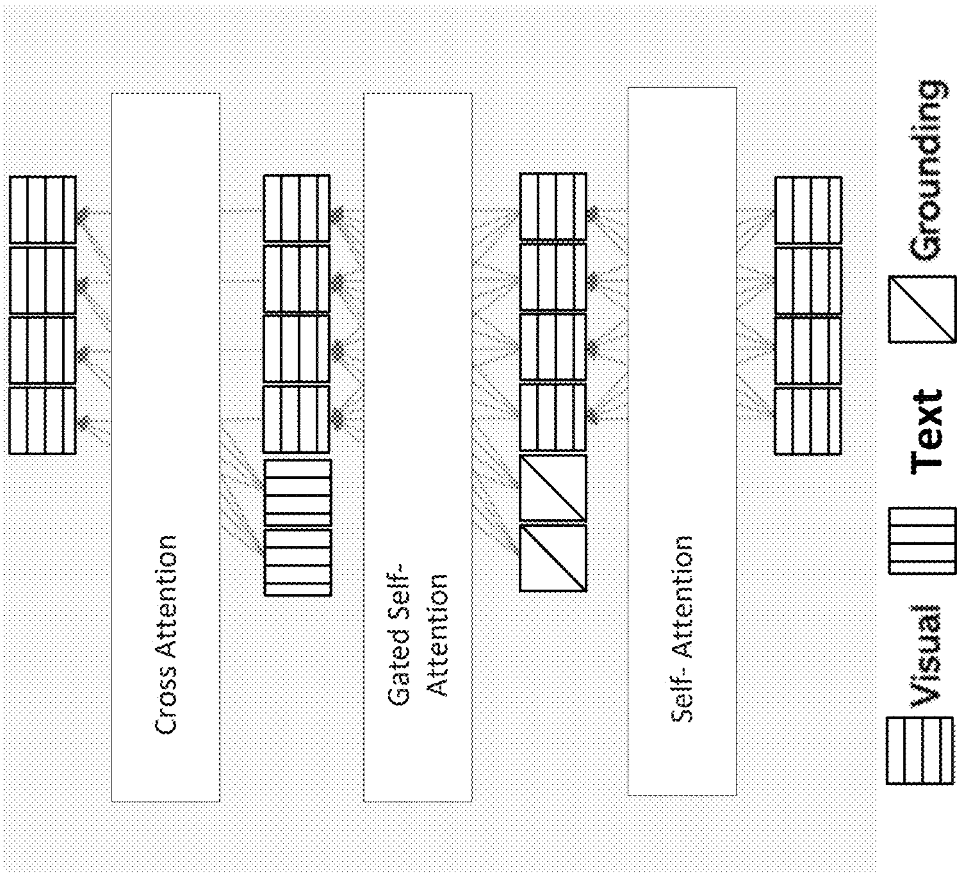
FIG. 3 depicts incorporation of gated self-attention layers into the latent diffusion model that may be used for out-of-place motion generation, in accordance with various aspects of the present disclosure.

An important task of our model is to generate out-of-place motion, given the spatio-temporal masks M. This can be formulated as a layout-conditioned generation, which requires generating an image following a layout condition (e.g., following the user-provided object trajectory). In various examples, gated self-attention may be used as shown in FIG. 3 to generate a layout-to-image generation model. This model encodes object bounding box coordinates into grounding tokens and fuses the grounding information with visual tokens via extra gated self-attention that is added before each cross-attention layer in the text-to-image model. Specifically, as shown in the middle column 204 of FIG. 2 and in FIG. 3, gated self-attention layers (which may be pre-trained) may be inserted into each transformer block of the text-to-image model 122 (e.g., Latent Diffusion for inpainting), as control module 124. An example of this modification is depicted in FIG. 3. Gated attention assists a vision transformer to focus on targeted regions (e.g., the regions identified by the grounding tokens which, in turn, represent the input layout) while suppressing feature activations in irrelevant regions. In other words, the gated self-attention layers enable the transformer blocks to better understand the spatial locality of input image patches (identified by the grounding tokens).

The control module 124 then utilizes grounding tokens that encapsulate both the appearance of the object and its box coordinates, enabling precise placement of the object in the desired location in the output frame $x_i$. The process may be streamlined, in various examples, by using the same Contrastive Language-Image Pre-training (CLIP) neural network model as an image encoder to extract regional image features of the cropped object. The box coordinates $b_i$ are projected into a continuous embedding using a Fourier transform function (or similar), controlling the spatial location. Thus, for the frame at time i, layout tokens $h_i$ are derived by integrating these conditions via a linear projection layer. These tokens then interact with the visual tokens of the same frame using gated self-attention (as shown in FIG. 3), ensuring accurate and contextually relevant out-of-place motion generation, such that:

$$h_i = MLP(CLIP_{img}(\text{crop }(x_1, b_1)), \text{Fourier }(b_i)) \quad (1)$$

$$v_i = SelfAtt(\text{concat }(h_i, v_i)) \quad (2)$$

Note that the concatenation operation above is for one attention block.

In-Place Motion Animation

In various examples, relying solely on the out-of-place inpainting strategy (e.g., using control module 124) only produces a rudimentary "copy-paste" animation for objects, causing noticeable inconsistencies in the motion of the object across frames of the output video. In order to pursue a smoother and authentic object-moving motion and ensure sustained visual coherence, an in-place motion animation module (e.g., motion module 126) may be used. Different inter-frame attention mechanism may be used to assist with this goal. However, typical approaches unanimously require large-scale pre-training from video data. Accordingly, in the zero-shot context, a pre-trained motion module 126 may be used as illustrated in middle column 204 as temporal attention layers that are incorporated into the pre-trained latent diffusion model, with weights copied from an original Text-to-Video generation task, but are used in the controllable I2V task of IVA$^0$ 100.

Figure 4:
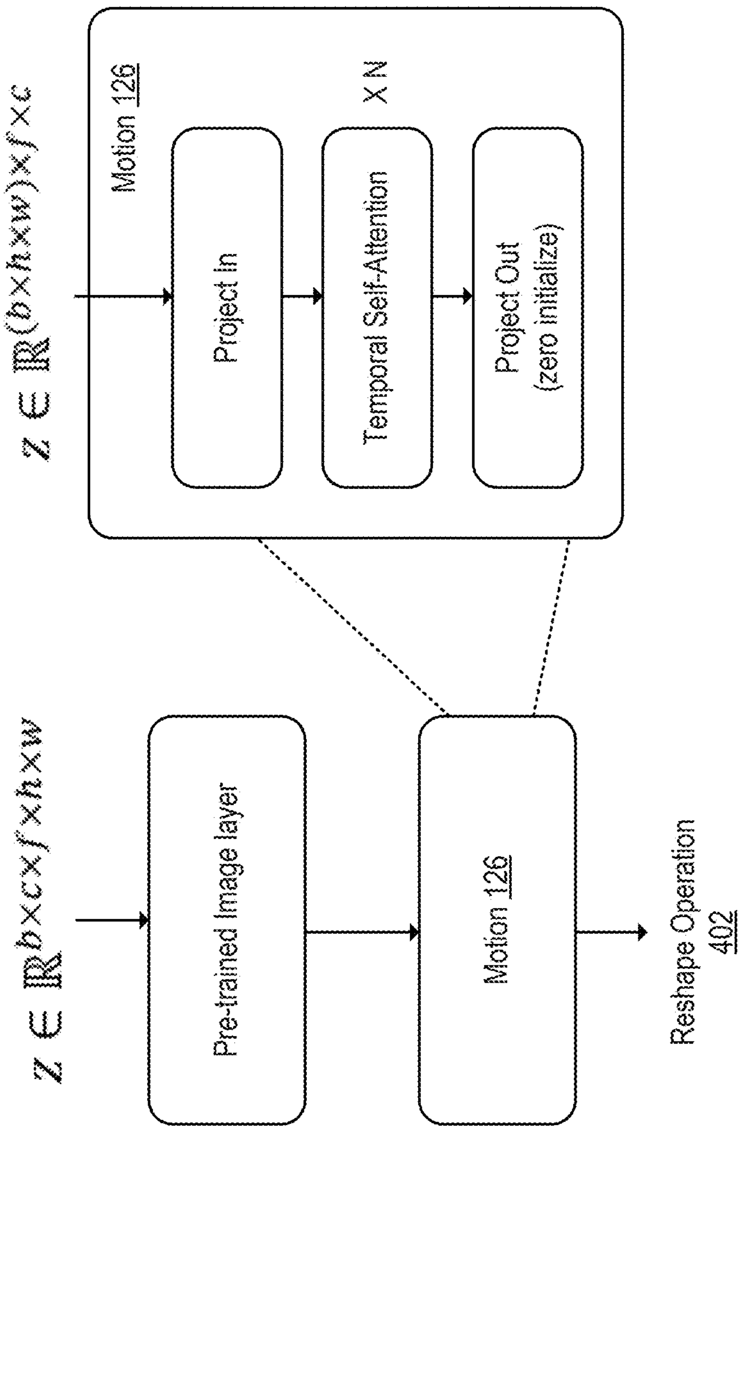
FIG. 4 depicts an example architecture of the motion module described in FIG. 1, in accordance with various aspects of the present disclosure.

FIG. 4 depicts an example architecture of the motion module 126, in accordance with various aspects of the present disclosure. Animating a personalized image model may typically require additional tuning with a corresponding video collection, making it much more challenging. However, given a personalized T2I model (e.g., DreamBooth, LoRA, and/or another latent diffusion T2I model), the model may be transformed into an animation generator with little or no training cost while preserving its original domain knowledge and quality. For example, suppose a T2I model is personalized for a specific 2D anime style. In that case, the corresponding animation generator should be capable of generating animation clips of that style with proper motions, such as foreground/background segmentation, character body movements, etc. This is the task of the motion module 126.

To achieve this, one approach may be to add temporal-aware structures to a T2I model and learning reasonable motion priors from large-scale video datasets. However, for the personalized domains, collecting sufficient personalized videos is costly and time-consuming. Meanwhile, limited data may lead to the knowledge loss of the source domain. Therefore, the motion module 126 may be separately pre-trained and/or adopted from a similar motion module 126 pre-trained for a given task. This model may then be plugged into IVA$^0$ 100 at inference time. By doing so, IVA$^0$ 100 avoids specific tuning for each personalized model. The motion module 126 may retain its pre-trained weights. Another advantage of such an approach is that once the motion module 126 is trained, it can be inserted into any personalized latent diffusion model, including IVA$^0$ 100, with no need for specific tuning because the personalizing process scarcely modifies the feature space of the base T2I model.

As shown in FIG. 4, motion modules may be inserted between the pre-trained image layers of the base latent diffusion model. When a data batch passes through the image layers and the motion module, its temporal and spatial axes may be reshaped into the batch axis separately (e.g., reshape operation 402 using equation (3) below).

This motion module 126 enables better temporal consistency for both object appearance and motion via self-attention across frames. Specifically, given the sequential frame visual features $V=(v_1 \ldots v_t)$, where $V \in R^{(t,h*w,c)}$, the feature axes may be reshaped and self-attention may be applied to the temporal dimension, where w, h, and c refer to width, height, and channel of the feature map, respectively. As shown in FIG. 4 on the right, the motion module 126 may be instantiated as a temporal transformer with a zero-initialized output project layer. The motion module 126 may take a 5 dimensional tensor in the shape of batch× channels ×frames×height×width as input.

$$V = \text{Reshape }(SelfAtt(\text{Reshape }(V))) \quad (3)$$

For the network design of the motion module 126, the goal may be to enable efficient information exchange across frames. To achieve this, a temporal transformer architecture may be used to model the motion priors. The temporal transformer comprises two or more self-attention blocks operating along the temporal axis. When passing through the motion module 126, the spatial dimensions height and width of the feature map z will first be reshaped to the batch dimension, resulting in batch×height×width sequences at the length of frames. The reshaped feature map will then be projected and go through several self-attention blocks, i.e., $$z = \text{Attention }(Q, K, V) = \text{Softmax}\left(\frac{QK^T}{\sqrt{d}}\right)\cdot V \quad (4)$$

where $Q=W^Q{}_Z$, $K=W^K{}_Z$, and $V=W^V{}_Z$ are three projections of the reshaped feature map. This operation enables the motion module 126 to capture the temporal dependencies between features at the same location across the temporal axis. To enlarge the receptive field of the motion module 126, the motion module 126 may be inserted at every resolution level of the U-shaped diffusion network (similar to the control module 124). Additionally, in some examples, sinusoidal position encodings may be added to the self-attention blocks to let the network be aware of the temporal location of the current frame in the animation clip.

The training process of the motion module 126 may be similar to the latent diffusion model. Sampled video data $$x_0^{1:N}$$

may first be encoded into the latent code $$z_0^{1:N}$$

frame by frame via the pre-trained autoencoder. Then, the latent codes may be noised using the defined forward diffusion schedule:

$$z_t^{1:N} = \sqrt{\bar{\alpha}_t}\, z_0^{1:N} + \sqrt{1-\bar{\alpha}_t}\,\epsilon.$$

The diffusion network augmented with the motion module 126 takes the noised latent codes and corresponding text prompts as input and predicts the noise strength added to the latent code, encouraged by the L2 loss term. The final training objective of the motion module 126 may be:

$$\mathcal{L} = \mathbb{E}_{\mathcal{E}(x_0^{1:N}),y,\epsilon\sim\mathcal{N}(0,I),t}\left[\left\|\epsilon - \epsilon_0\left(z_t^{1:N}, t, \tau_\theta(y)\right)\right\|_2^2\right]$$

Note that pre-trained versions of the motion module 126 may be available enabling a version of the motion module 126 to be obtained and plugged into IVA$^0$ 100 without requiring any annotated video data.

Both the control modules 124 and motion modules 126 may be pre-trained on different task-specific data. Note that FIG. 2 displays a single modified transformer block of the latent diffusion, modified to incorporate the control modules 124 and motion modules 126. The control modules 124 and motion modules 126 integrate capabilities from their original Layout-Conditioned Image Generation and Text-to-Video tasks. These pre-established foundations may be incorporated into IVA$^0$ 100 to avoid further re-training. Thus, IVA$^0$ 100 can controllably animate objects in an image without any Controllable I2V-specific fine-tuning.

Motion Afterimage Suppression

As IVA$^0$ 100 model may be built upon the Text-to-Image in-painting latent diffusion model, the model may initially be prompted with a fixed background-filling text prompt (shown in the middle column 204 of FIG. 2 (i.e., "Background, good quality") for background generation. However, this approach sometimes results in an afterimage (e.g., a ghost-like residual hallucination in the object's previous location after the object has moved. It has been determined that this issue may be linked to the motion module 126. This is because most current motion modules 126 only generate limited-range, in-place motion. For this reason, when an object moves significantly from its original location $b_1$, the temporal attention mechanism fails to maintain appearance consistency. Inversely, the temporal attention often wrongly produces an afterimage at $b_1$ in $x_t$.

To suppress such a motion afterimage, extra grounding tokens may be used for the background generation. As illustrated in FIG. 2, in middle column 204, grounding tokens that encode both the bounding box and the word 'background' (via a CLIP text embedding) may be used. In this case, the control module 124 is forced to generate a background at $b_1$ in frame $x_t$. This method successfully avoids afterimage hallucinations for small objects but may still struggle with large areas/objects. This limitation may stem from the control module 124's training on background reconstruction, which may be unable to handle large-region in-painting with a single token. To overcome this, right hand column 206 illustrates a motion afterimage suppression (MAS) technique. The motion afterimage suppression technique may integrate two background generation approaches based on object size and Intersection over Union (IoU). In various examples, objects may first be categorized by size (small, medium, large) with pre-defined area thresholds. Small objects may use extra grounding tokens for background in-painting, whereas large objects may not. For medium-sized objects, as shown in the right hand column 206 of FIG. 2, the IoU S between $b_1$ and $b_t$ may first be calculated. If S>0, indicating overlap between $b_1$ and $b_t$, the non-overlapping background areas (e.g., a bounded region in $b_1$ that does not overlap with $b_t$) may first be divided into grids, iteratively. The model may then in-paints each grid with background class tokens. MAS may significantly mitigate the afterimage object hallucination issue while maintaining high-quality background generation.

Latent Diffusion Models

As described herein, the base text-to-image model 122 may be a pre-trained latent diffusion model that may be modified as previously described. Generally, latent diffusion models are generative models that learn the data distribution by reversing a fixed-length Markovian forward process, thereby iteratively denoising a normally distributed variable. In some cases, instead of using the pixel space, denoising can be conducted in a latent space, which is computationally efficient as it reduces the dimension of images. Additionally, use of the latent space omits the high frequency noise within the given image. One example of a latent diffusion models is Stable Diffusion, which includes three main components: A Variational Autoencoder (VAE) to transform the given input in a latent space, a text encoder to process the given text on which image generation is conditioned, and a time-conditioned UNet to predict the noise that is added on the image latents which is conditioned by the text embeddings. Mathematically, the conditioned latent diffusion model can be learned by optimizing the following loss:

$$L_{LDM} = \mathbb{E}_{\mathcal{E}(x),c,\epsilon,t}\left[\|\epsilon_\theta(z_t, t, c) - \epsilon\|_2^2\right]$$

where, $z_t$ is the latent version of the input $x_t$ provided by the VAE as $z=\mathcal{E}(x)$. $x_t$ is the noise added version of the input x, at a timestep of t, where $x=\alpha_t x_0+(1-\alpha_t)\epsilon$ and $\alpha_t$ decreases with the timestamp t. Noise is denoted by $\epsilon\sim\mathcal{N}(0,1)$. $\epsilon_\theta$ is the UNet. Lastly, c denotes the conditioning variable, and for the text guided models, it is given by processing the given text with the CLIP text encoder.

Figure 5:
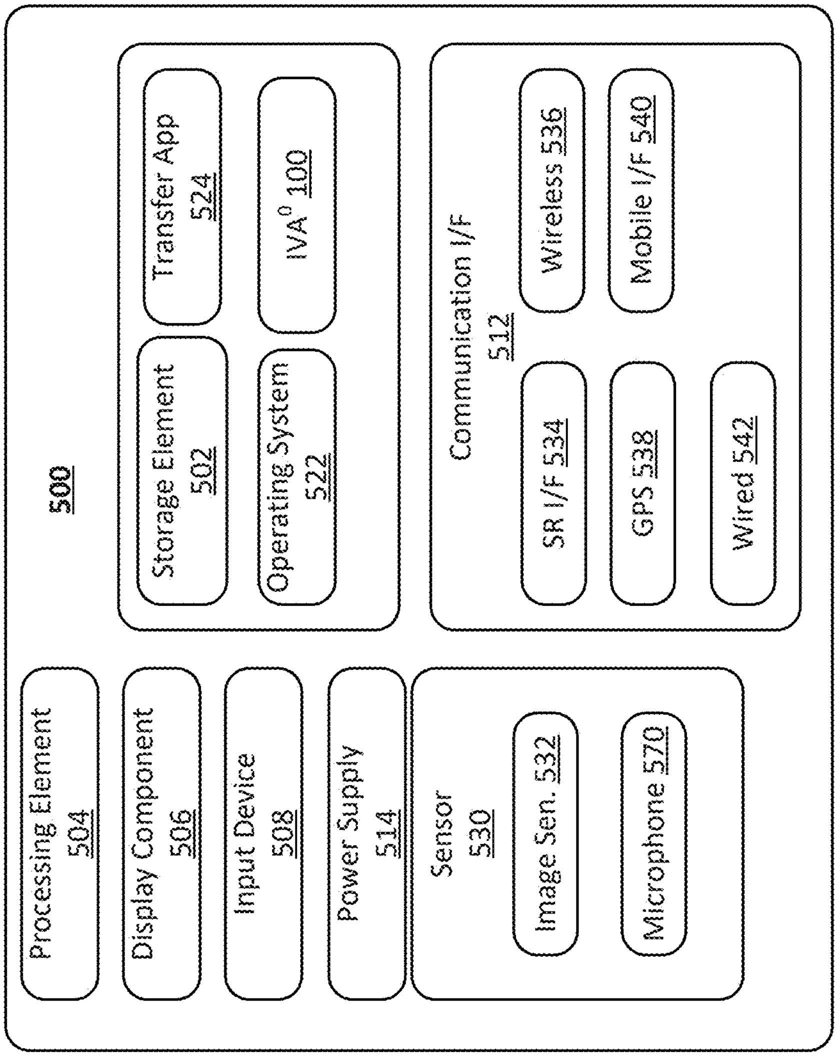
FIG. 5 is a block diagram showing an example architecture of a computing device that may be used in accordance with various aspects of the present disclosure.

FIG. 5 is a block diagram showing an example architecture 500 of a computing device that may be used to instantiate the various machine learning models such as the latent diffusion models, generative models, transformers, encoders, and/or the other models described herein, in accordance with various aspects of the present disclosure. It will be appreciated that not all devices will include all of the components of the architecture 500 and some user devices may include additional components not shown in the architecture 500. The architecture 500 may include one or more processing elements 504 for executing instructions and retrieving data stored in a storage element 502. The processing element 504 may comprise at least one processor. Any suitable processor or processors may be used. For example, the processing element 504 may comprise one or more digital signal processors (DSPs). The storage element 502 can include one or more different types of memory, data storage, or computer-readable storage media devoted to different purposes within the architecture 500. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc. Additionally, storage element 502 may store parameters, and/or machine learning models generated using the various techniques described herein.

The storage element 502 may also store software for execution by the processing element 504. An operating system 522 may provide the user with an interface for operating the computing device and may facilitate communications and commands between applications executing on the architecture 500 and various hardware thereof. A transfer application 524 may be configured to receive images, audio, and/or video from another device (e.g., a mobile device, image capture device, and/or display device) or from an image sensor 532 and/or microphone 570 included in the architecture 500.

When implemented in some user devices, the architecture 500 may also comprise a display component 506. The display component 506 may comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 506 may be effective to display suggested personalized search queries generated in accordance with the various techniques described herein.

The architecture 500 may also include one or more input devices 508 operable to receive inputs from a user. The input devices 508 can include, for example, a push button, touch pad, touch screen, wheel, joystick, keyboard, mouse, trackball, keypad, light gun, game controller, or any other such device or element whereby a user can provide inputs to the architecture 500. These input devices 508 may be incorporated into the architecture 500 or operably coupled to the architecture 500 via wired or wireless interface. In some examples, architecture 500 may include a microphone 570 or an array of microphones for capturing sounds, such as voice requests. In various examples, audio captured by microphone 570 may be streamed to external computing devices via communication interface 512.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 500 may also include a power supply 514, such as a wired alternating current (AC) converter, a rechargeable battery operable to be recharged through conventional plug-in approaches, or through other approaches such as capacitive or inductive charging.

The communication interface 512 may comprise one or more wired or wireless components operable to communicate with one or more other computing devices. For example, the communication interface 512 may comprise a wireless communication module 536 configured to communicate on a network, such as the network 604, according to any suitable wireless protocol, such as IEEE 802.11 or another suitable wireless local area network (WLAN) protocol. A short range interface 534 may be configured to communicate using one or more short range wireless protocols such as, for example, near field communications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the architecture 500. A wired communication module 542 may be configured to communicate according to the USB protocol or any other suitable protocol.

The architecture 500 may also include one or more sensors 530 such as, for example, one or more position sensors, image sensors, and/or motion sensors. An image sensor 532 is shown in FIG. 5. Some examples of the architecture 500 may include multiple image sensors 532. For example, a panoramic camera system may comprise multiple image sensors 532 resulting in multiple images and/or video frames that may be stitched and may be blended to form a seamless panoramic output. An example of an image sensor 532 may be a camera configured to capture color information, image geometry information, and/or ambient light information. In some further examples, the image sensor 532 may comprise a depth sensor and/or multiple depth sensors. For example, the image sensor 532 may include a TOF sensor, stereoscopic depth sensors, a lidar sensor, radar, etc.

As noted above, multiple devices may be employed in a single system. In such a multi-device system, each of the devices may include different components for performing different aspects of the system's processing. The multiple devices may include overlapping components. The components of the computing devices, as described herein, are exemplary, and may be located as a stand-alone device or may be included, in whole or in part, as a component of a larger device or system.

An example system for sending and providing data will now be described in detail.

Figure 6:
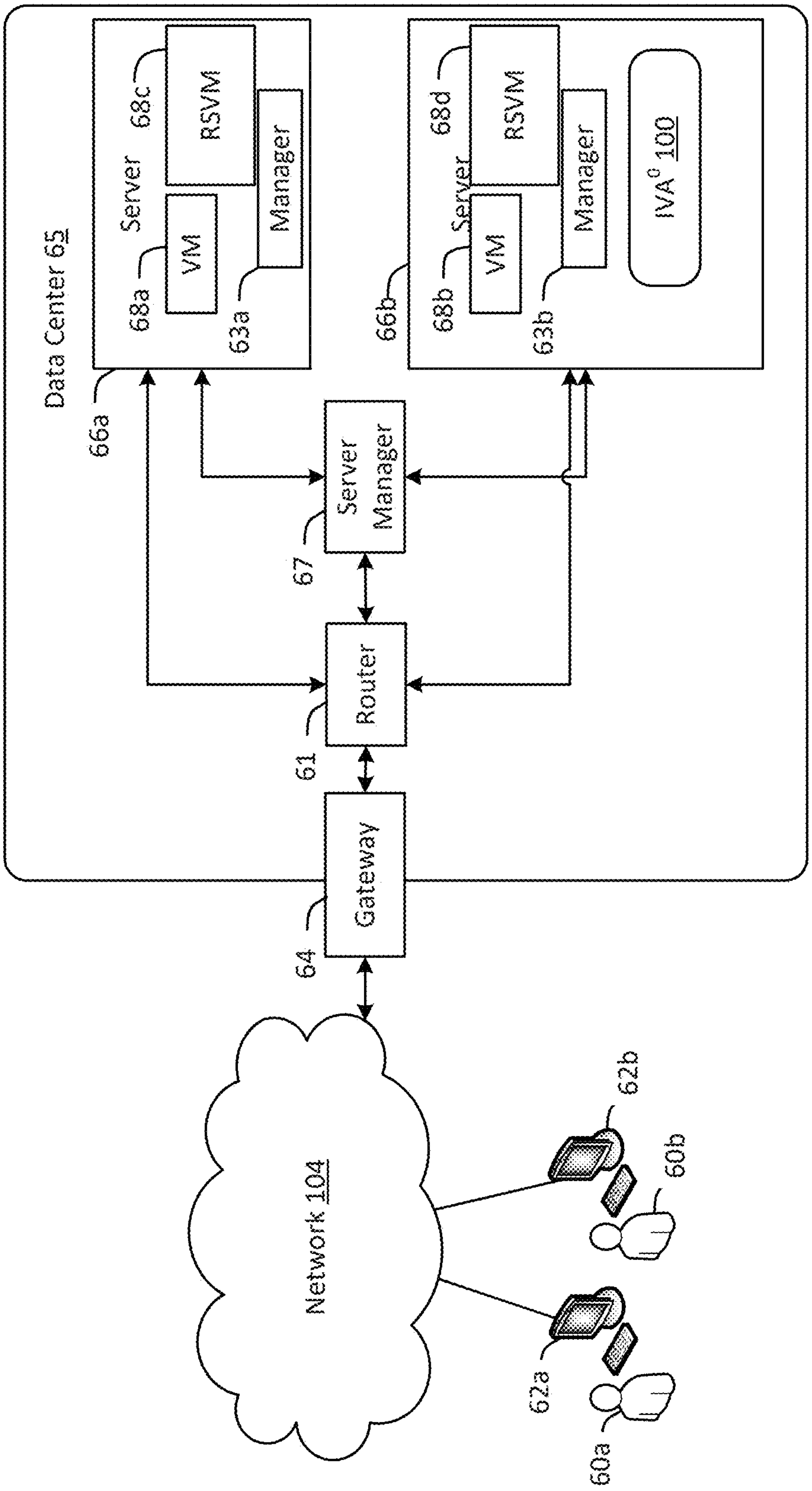
FIG. 6 is a diagram illustrating an example system for sending and providing data that may be used in accordance with the present disclosure.

In particular, FIG. 6 illustrates an example computing environment in which the embodiments described herein may be implemented. For example, the computing environment of FIG. 6 may be used to provide the various machine learning models described herein as a service over a network wherein one or more of the techniques described herein may be requested by a first computing device and may be performed by a different computing device configured in communication with the first computing device over a network. FIG. 6 is a diagram schematically illustrating an example of a data center 65 that can provide computing resources to users 60*a* and 60*b* (which may be referred herein singularly as user 60 or in the plural as users 60) via user computers 62*a* and 62*b* (which may be referred herein singularly as user computer 62 or in the plural as user computers 62) via network 604. Data center 65 may be configured to provide computing resources for executing applications on a permanent or an as-needed basis. The computing resources provided by data center 65 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. In various examples, the instances may be configured to execute one or more of the various machine learning techniques described herein.

These services may be configurable with set or custom applications and may be configurable in size, execution, cost, latency, type, duration, accessibility and in any other dimension. These web services may be configured as available infrastructure for one or more clients and can include one or more applications configured as a system or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 65 may include servers 66*a* and 66*b* (which may be referred herein singularly as server 66 or in the plural as servers 66) that provide computing resources. These resources may be available as bare metal resources or as virtual machine instances 68*a-d* (which may be referred herein singularly as virtual machine instance 68 or in the plural as virtual machine instances 68). In at least some examples, server manager 67 may control operation of and/or maintain servers 66. Virtual machine instances 68*c* and 68*d* are rendition switching virtual machine ("RSVM") instances. The RSVM virtual machine instances 68*c* and 68*d* may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines.

The availability of virtualization technologies for computing hardware has afforded benefits for providing large-scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, network 604 may, for example, be a publicly accessible network of linked networks and possibly operated by various distinct parties, such as the Internet. In other embodiments, network 604 may be a private network, such as a corporate or university network that is wholly or partially inaccessible to non-privileged users. In still other embodiments, network 604 may include one or more private networks with access to and/or from the Internet.

Network 604 may provide access to user computers 62. User computers 62 may be computers utilized by users 60 or other customers of data center 65. For instance, user computer 62*a* or 62*b* may be a server, a desktop or laptop personal computer, a tablet computer, a wireless telephone, a personal digital assistant (PDA), an e-book reader, a game console, a set-top box or any other computing device capable of accessing data center 65. User computer 62*a* or 62*b* may connect directly to the Internet (e.g., via a cable modem or a Digital Subscriber Line (DSL)). Although only two user computers 62*a* and 62*b* are depicted, it should be appreciated that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 6 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63*a* or 63*b* (which may be referred herein singularly as instance manager 63 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 65 shown in FIG. 6, a router 61 may be utilized to interconnect the servers 66*a* and 66*b*. Router 61 may also be connected to gateway 64, which is connected to network 604. Router 61 may be connected to one or more load balancers, and alone or in combination may manage communications within networks in data center 65, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 6, a data center 65 is also employed to at least in part direct various communications to, from and/or between servers 66*a* and 66*b*. While FIG. 6 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location or other attributes associated with user computers 62, a nature of a task with which the communications are associated, a priority of a task with which the communications are associated, a duration of a task with which the communications are associated, a size and/or estimated resource usage of a task with which the communications are associated and many other factors. Data center 65 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 65 described in FIG. 6 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, used to implement and distribute the infrastructure and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example, computer servers, storage devices, network devices, and the like. In some embodiments, a client or user may be provided direct access to a resource instance, e.g., by giving a user an administrator login and password. In other embodiments, the provider network operator may allow clients to specify execution requirements for specified client applications and schedule execution of the applications on behalf of the client on execution systems (such as application server instances, Java™ virtual machines (JVMs), general-purpose or special-purpose operating systems that support various interpreted or compiled programming languages such as Ruby, Perl, Python, C, C++, and the like, or high-performance computing systems) suitable for the applications, without, for example, requiring the client to access an instance or an execution system directly. A given execution system may utilize one or more resource instances in some implementations; in other implementations, multiple execution systems may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware system, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments, the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Figure 7:
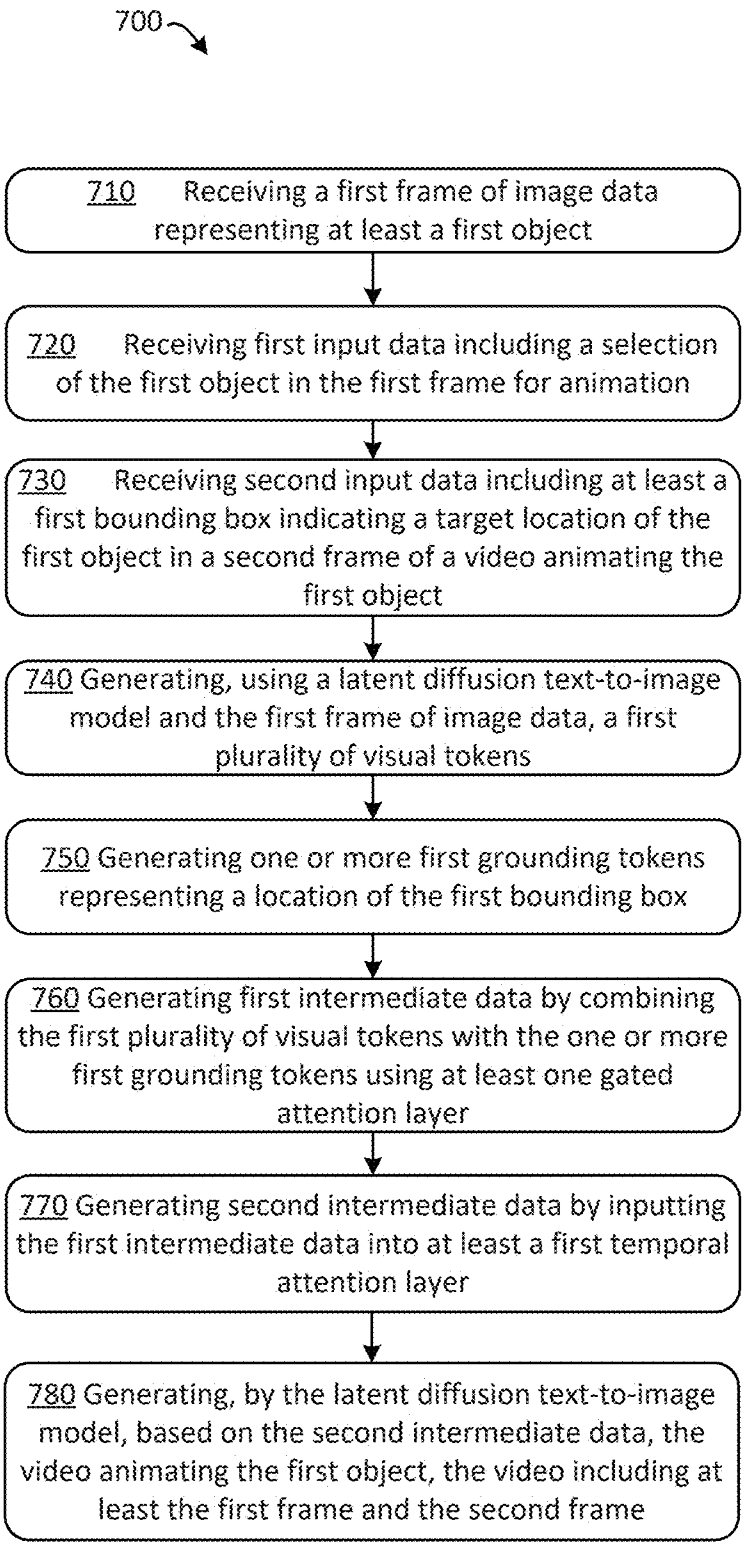
FIG. 7 is a block diagram illustrating an example process for controllable image-to-video generation, in accordance with embodiments of the present disclosure.

FIG. 7 is a block diagram illustrating an example process for controllable image-to-video generation, in accordance with embodiments of the present disclosure. Those actions in FIG. 7 that have been previously described in reference to FIGS. 1-6 may not be described again herein for purposes of clarity and brevity. The actions of the process depicted in the flow diagram of FIG. 7 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 700 may begin at action 710, at which a first frame of image data representing at least a first object may be received. The first frame of image data may be the subject image with one or more objects (e.g., the first object) that a user would like to animate within the scene represented by the first frame of image data.

Processing may continue at action 720, at which first input data including a selection of the first object in the first frame may be received. The first input data may identify an object (e.g., the first object) that the user would like to animate within the scene represented by the first frame of image data. The first input data may be provided by a user drawing a bounding box around the object, the user selecting an object that was previously identified using semantic segmentation and/or a computer vision-based object detector, etc.

Processing may continue at action 730, at which second input data including at least a first bounding box indicating a target location of the first object in a second frame of a video animating the first object may be received. For example, the user may provide a layout including bounding boxes representing locations within the first frame to which the selected object(s) should move in a video animating the selected object(s). In some examples, instead of providing bounding box locations representing movement of the object in the video, the user may draw a motion path and/or trajectory on the first frame of image data indicating a path that should be taken by the first object in the video. In some examples, bounding boxes for different object locations may be automatically generated along the user-provided motion path and/or trajectory so that the animated objected can be in-painted at those locations during video generation by $IVA^{0}$ 100.

Processing may continue at action 740, at which a latent diffusion text-to-image model (e.g., modified as described herein) may generate a first plurality of visual tokens (e.g., intermediate visual tokens). For example, the autoencoder and/or self attention blocks of the latent diffusion model may generate the first plurality of visual tokens representing the pixels of the input image (e.g., representing both the first object and the background of the first frame of image data).

Processing may continue at action 750, at which one or more first grounding tokens representing a location of the first bounding box may be generated. The grounding tokens may represent the coordinates of the various bounding boxes in the spatio-temporal masks described above in reference to FIG. 2 which represent, frame-by-frame, the original location of the selected object and the updated position of the selected object (defined by the user-provided layout). For example, the grounding tokens may represent the first bounding box in the first frame of image data (e.g., the location of the object in the initial frame) and/or the user-provided layout (e.g., the target locations of the selected object along the motion path). The grounding tokens may be fused with the first plurality of visual tokens so that the latent diffusion model can focus on the targeted regions while suppressing feature activations in irrelevant regions (e.g., using gated attention). Accordingly, at action 760, first intermediate data (e.g., fused visual and grounding tokens) may be generated by combining the first plurality of visual tokens with the one or more first grounding tokens using at least one gated attention layer.

Processing may continue at action 770, at which second intermediate data may be generated by inputting the first intermediate data into at least a first temporal attention layer. For example, after generating the first intermediate data using the control module 124, temporal attention may be applied (e.g., by the motion module 126) to perform the reshape operation described above in reference to FIG. 4 resulting in the second intermediate data.

Processing may continue at action 780 at which the latent diffusion text-to-image model may generate, based on the second intermediate data, the video animating the first object, the video including at least the first frame and the second frame. For example, after the denoising process of the latent diffusion text-to-image model, the decoder may decode the latent representation of each frame into the pixel space to generate the frames of the video. The latent diffusion text-to-image model may inpaint the selected object at the locations defined by the user-provided layout (e.g., the first bounding box indicating the target location, as well as any other target locations defined by the user-provided layout). Additionally, the latent diffusion text-to-image model may inpaint the location where the object was previously located (e.g., the object's location in the first frame) with plausible-looking background image data that conforms to the scene in the first frame of image data. Accordingly, the video may animate the first object moving within the scene according to the user-defined layout. The temporal attention mechanism of the motion module 126 may provide smooth pixel-level changes so that the object appears to move in a realistic way (e.g., depicting typical arm, leg, and body movements of a human running) from frame-to-frame of the video.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A computer-implemented method, comprising:

receiving a first image representing at least a first object;

receiving first input data comprising a selection of the first object in the first image, the selection of the first object indicating that the first object is to be animated along a motion path;

receiving second input data comprising at least a first bounding box indicating a target location of the first object;

inputting the first image into a pre-trained latent diffusion text-to-image model;

generating, using the pre-trained latent diffusion text-to-image model and the first image, a first plurality of visual tokens;

generating one or more first grounding tokens representing a location of the first bounding box;

generating, using the first plurality of visual tokens and the one or more first grounding tokens, a spatio-temporal mask comprising a region corresponding to a first location of the first object and a region corresponding to the target location;

generating first intermediate visual tokens by combining the one or more first grounding tokens and the first plurality of visual tokens using a gated self-attention layer;

generating second intermediate visual tokens by combining the first intermediate visual tokens and text prompt tokens using a cross-attention layer;

generating output visual tokens by inputting the second intermediate visual tokens into at least one temporal attention layer; and generating a frame of video by denoising the output visual tokens using a denoising process of the pre-trained latent diffusion text-to-image model, wherein the frame of the video comprises a representation of the first object at the target location, wherein the pre-trained latent diffusion text-to-image model comprises a zero-shot image-to-video model configured to animate the first image using user-provided motion layouts and the spatio-temporal mask.

2. The computer-implemented method of claim 1, further comprising:

determining a second bounding box representing a location of the first object in the first image;

determining a first area associated with the second bounding box in the first image at least partially overlaps with a second area associated with the first bounding box in the frame in a coordinate space shared by the first image and the frame;

determining a bounded region of the second bounding box that does not overlap with the first bounding box; and generating one or more second grounding tokens indicating that the bounded region is background, wherein the one or more second grounding tokens are combined with the first intermediate visual tokens using the cross-attention layer.

3. The computer-implemented method of claim 1, wherein portions of the first image other than the first object are maintained in the frame of the video.

4. A method comprising:

receiving a first image representing at least a first object;

receiving first input data comprising a selection of the first object in the first image for animation;

receiving second input data comprising at least a first bounding box indicating a target location of the first object;

generating, using a latent diffusion text-to-image model and the first image, a first plurality of visual tokens;

generating one or more first grounding tokens representing a location of the first bounding box;

generating a spatio-temporal mask comprising a region corresponding to a first location of the first object and a region corresponding to the target location; and generating, by the latent diffusion text-to-image model based on the first plurality of visual tokens and the one or more first grounding tokens, a video animating the first object, wherein the latent diffusion text-to-image model comprises a zero-shot image-to-video model configured to animate the first image using user-provided motion layouts and the spatio-temporal mask, and wherein the video comprises at least the first image and a second image comprising a representation of the first object at the target location.

5. The method of claim 4, further comprising:

generating, using an encoder of the latent diffusion text-to-image model, the first plurality of visual tokens representing the first image; and generating first intermediate data by combining the first plurality of visual tokens and the one or more first grounding tokens using a gated self-attention layer.

6. The method of claim 5, further comprising:

determining a second plurality of visual tokens representing the second image; and generating modified second plurality of visual tokens by applying self-attention between the first plurality of visual tokens and the second plurality of visual tokens.

7. The method of claim 6, further comprising:

generating the second image of the video using a denoising processing of the latent diffusion text-to-image model on the modified second plurality of visual tokens to transform the modified second plurality of visual tokens from a latent space to a pixel space.

8. The method of claim 4, further comprising:

determining a second bounding box representing a location of the first object in the first image;

determining that the first bounding box and the second bounding box at least partially overlap in a coordinate space of the first image and the second image;

determining a region of the second bounding box that does not overlap with the first bounding box; and generating one or more second grounding tokens indicating that the region is background, wherein the one or more second grounding tokens are combined with a representation of the first plurality of visual tokens using a cross-attention layer.

9. The method of claim 4, further comprising:

determining a second bounding box representing a location of the first object in the first image; and generating first mask data comprising a union of the first bounding box and the second bounding box, wherein the latent diffusion text-to-image model masks out image data in the first image defined by the first mask data for an inpainting task.

10. The method of claim 4, further comprising:

determining a second bounding box representing a location of the first object in the first image; and generating one or more second grounding tokens comprising text indicating that the second bounding box is background.

11. A system comprising:

at least one processor; and non-transitory computer-readable memory storing instructions that, when executed by the at least one processor, are effective to:

receive a first image representing at least a first object;

receive first input data comprising a selection of the first object in the first image for animation;

receive second input data comprising at least a first bounding box indicating a target location of the first object;

generate, using a latent diffusion text-to-image model and the first image, a first plurality of visual tokens;

generate one or more first grounding tokens representing a location of the first bounding box;

generate a spatio-temporal mask comprising a region corresponding to a first location of the first object and a region corresponding to the target location; and generate, by the latent diffusion text-to-image model based on the first plurality of visual tokens and the one or more first grounding tokens, a video animating the first object, wherein the latent diffusion text-to-image model comprises a zero-shot image-to-video model configured to animate the first image using user-provided motion layouts and the spatio-temporal mask, and wherein the video comprises at least the first image and a second image comprising a representation of the first object at the target location.

12. The system of claim 11, the non-transitory computer-readable memory storing further instructions that, when executed by the at least one processor, are further effective to:

generate, using an encoder of the latent diffusion text-to-image model, the first plurality of visual tokens representing the first image; and generate first intermediate data by combining the first plurality of visual tokens and the one or more first grounding tokens using a gated self-attention layer.

13. The system of claim 12, the non-transitory computer-readable memory storing further instructions that, when executed by the at least one processor, are further effective to:

determine a second plurality of visual tokens representing the second image; and generate modified second plurality of visual tokens by applying self-attention between the first plurality of visual tokens and the second plurality of visual tokens.

14. The system of claim 13, the non-transitory computer-readable memory storing further instructions that, when executed by the at least one processor, are further effective to:

generate the second image of the video using a denoising processing of the latent diffusion text-to-image model on the modified second plurality of visual tokens to transform the modified second plurality of visual tokens from a latent space to a pixel space.

15. The system of claim 11, the non-transitory computer-readable memory storing further instructions that, when executed by the at least one processor, are further effective to:

determine a second bounding box representing a location of the first object in the first image;

determine that the first bounding box and the second bounding box at least partially overlap in a coordinate space of the first image and the second image;

determine a region of the second bounding box that does not overlap with the first bounding box; and generate one or more second grounding tokens indicating that the region is background, wherein the one or more second grounding tokens are combined with a representation of the first plurality of visual tokens using a cross-attention layer.

16. The system of claim 11, the non-transitory computer-readable memory storing further instructions that, when executed by the at least one processor, are further effective to:

determine a second bounding box representing a location of the first object in the first image; and generate first mask data comprising a union of the first bounding box and the second bounding box, wherein the latent diffusion text-to-image model masks out image data in the first image defined by the first mask data for an inpainting task.

17. The system of claim 11, the non-transitory computer-readable memory storing further instructions that, when executed by the at least one processor, are further effective to:

determine a second bounding box representing a location of the first object in the first image; and generate one or more second grounding tokens comprising text indicating that the second bounding box is background.

* * * * *